July 3, 1934.  B. H. HAWKINS  1,965,237
VALVE DEVICE
Original Filed July 12, 1930  3 Sheets-Sheet 1
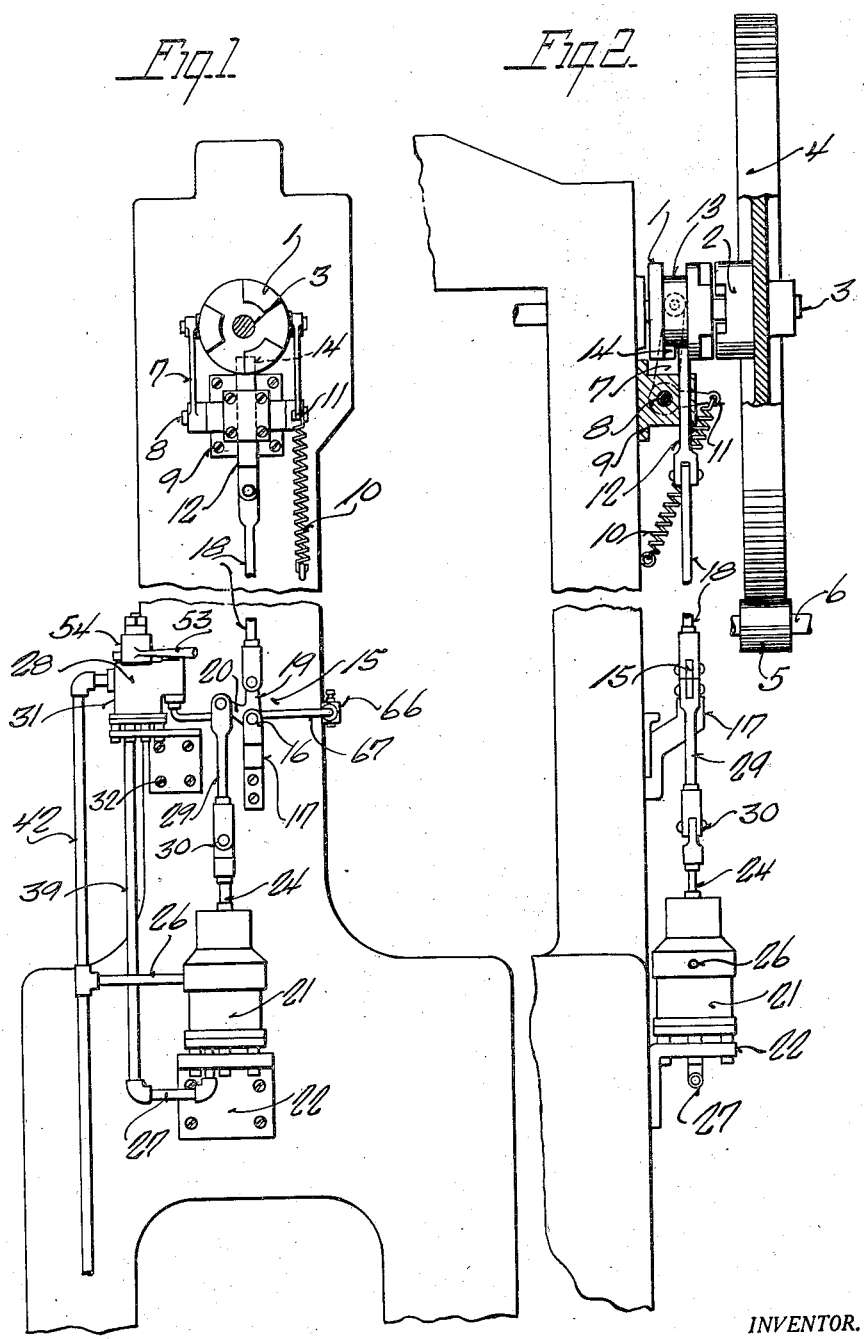
INVENTOR.
Bert H. Hawkins
BY Bottum, Hudnall, Lecher,
McNamara & Michael,
ATTORNEYS July 3, 1934. B. H. HAWKINS 1,965,237
VALVE DEVICE
Original Filed July 12, 1930 3 Sheets-Sheet 2
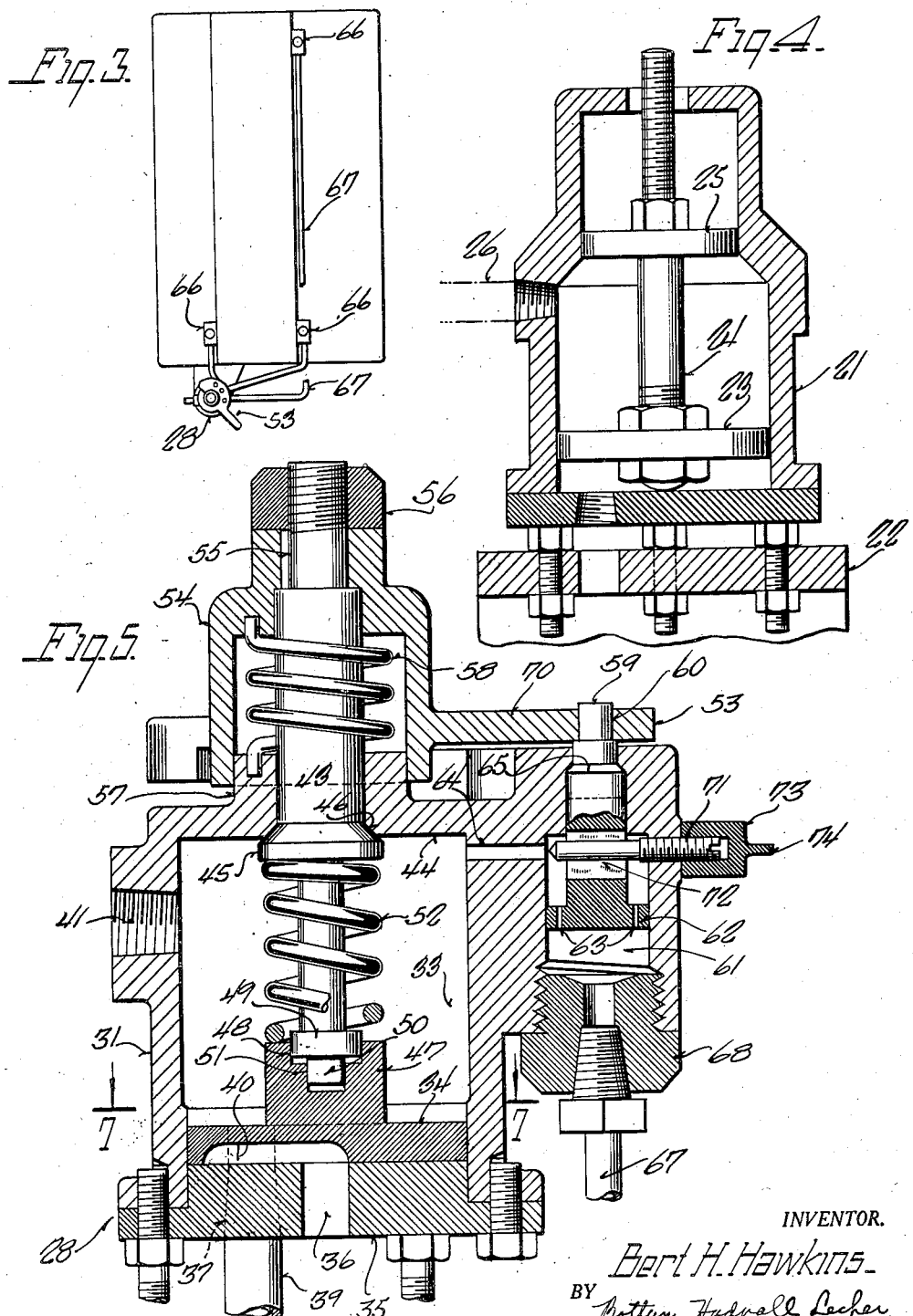
INVENTOR.
Bert H. Hawkins
BY
ATTORNEYS July 3, 1934.  B. H. HAWKINS  1,965,237
VALVE DEVICE
Original Filed July 12, 1930  3 Sheets-Sheet 3
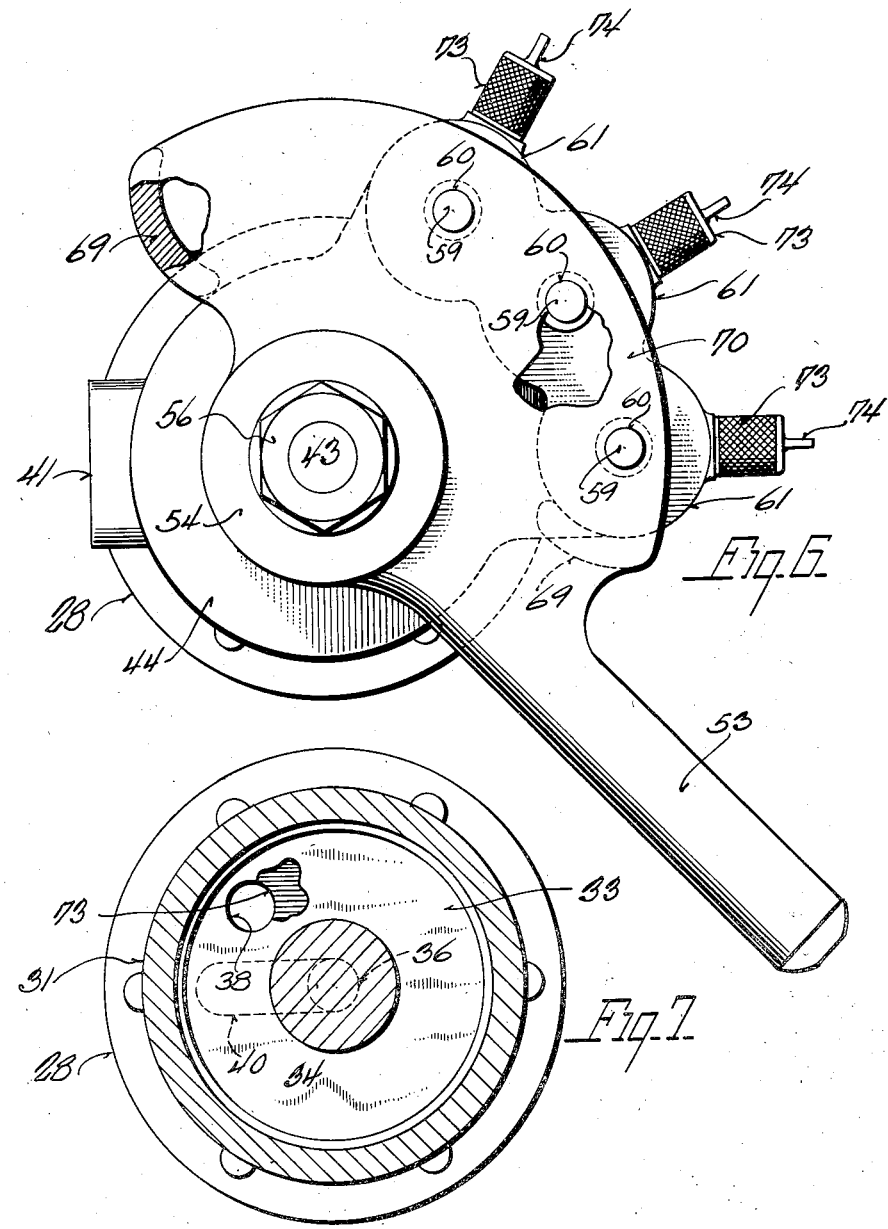
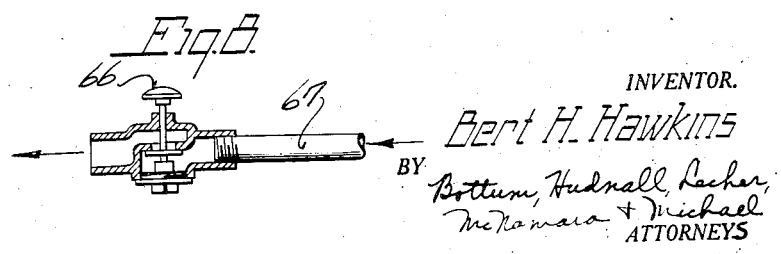
INVENTOR.
*Bert H. Hawkins*
BY
ATTORNEYS Patented July 3, 1934

1,965,237

UNITED STATES PATENT OFFICE 1,965,237

VALVE DEVICE

Bert H. Hawkins, Royal Oak, Mich., assignor to McCord Radiator & Manufacturing Company, Detroit, Mich., a corporation of Maine Original application July 12, 1930, Serial No. 467,474. Divided and this application December 5, 1931, Serial No. 579,241

4 Claims. (Cl. 251—164)

In my co-pending application Serial No. 467,474, filed July 12, 1930, of which the present application is a division, I disclose and claim a safety device for a punch press to prevent accidental repeating of the press and thus avoid accidents heretofore occurring through that source.

The setting of the press in and out of action is controlled through the safety device through a manually operable control valve which forms the subject matter of the present application.

One object of the invention of the present application is to provide a control valve of such a construction and design that it is especially adaptable for use with the safety device referred to and by means of which valve the operator may readily and easily control the operation of the press through the safety device.

Another object of the invention is to provide a valve of such a construction that the pressure fluid controlled thereby to operate the safety device is admitted into the valve and acts on certain of the parts thereof to seat them and thus avoid the need of stuffing boxes or other packing means to provide leak proof joints in the valve structure.

A further object of the invention is to provide a novel form of lock for automatically locking the control valve in press stopping position as soon as the valve returns to that position and thus prevent accidental movement of the valve to repeat the press except when desired.

A further object of the invention is to provide a plurality of locking elements for the control valve so that all of said elements must be released from the valve before the latter can be moved to start the press and thus enable the locks to be actuated from various points about the press as required for a system of remote control.

A further object of the invention is to arrange these locking elements at different distances from the center of movement or axis of the valve so that one element cannot enter or engage the recess or opening provided for any other element to interfere with the proper working of the valve.

The invention consists further in the matters hereafter described and claimed.

In the accompanying drawings:

Fig. 1 shows a safety device for a punch press equipped with a control valve of my invention;

Fig. 2 is a side view of the assembly shown in Fig. 1, with parts in section;

Fig. 3 is a diagrammatic view showing the remote control;

Fig. 4 is a vertical sectional view taken through the power unit;

Fig. 5 is a similar view taken through the control valve;

Fig. 6 is a top plan view of the valve;

Fig. 7 is a horizontal sectional view taken on line 7—7 of Fig. 5; and

Fig. 8 is a fixture to be hereinafter described.

The press to which my invention is applicable is of the intermittently operated positive clutch type. The clutch is at one side of the press and includes two members 1, 2, both on the crank shaft 3. The member 1 is splined on the shaft for sliding movement into and out of clutched engagement with the member 2 which is carried by a large gear wheel 4 revolubly mounted on shaft 3 and meshing with a drive pinion 5 on a fly-wheel provided jack shaft 6, as shown in Fig. 2. The clutch members 1, 2 have lugs or teeth which when engaged connect the crank shaft 3 with the continuously revolving driving gear 4. A yoke 7 is employed to slide clutch member 1 into and out of clutched engagement with member 2, the yoke rocking on a horizontal axis 8 in a bracket 9 secured to the frame of the press, as shown in Figs. 1 and 2. The movement of the yoke to engage the clutch is affected by a coiled spring 10, one end of which is attached to the frame of the press and the other end to an arm 11 extending outward from the yoke. An endwise movable dog 12 is used to de-clutch member 1 from member 2. The upper end of the dog is beveled and when projected into an annular groove 13 in member 1 is in the path of a cam lug 14 in said groove. Contact of the lug with the dog causes member 1 to be slid out of engagement with member 2. Withdrawing the dog from the lug releases member 1 and spring 10 moves the same into clutched engagement with member 2.

The safety device with which my control valve of the present invention is employed, comprises a bell crank lever 15 fulcrumed at 16 on a bracket 17 fastened to the frame of the press. A link 18 connects the dog 12 with the vertical arm 19 of the lever. When the dog is in clutch releasing position, the pivotal connections between link 18, dog 12 and fulcrum 16 are in direct alignment so that the parts are on dead center and the dog cannot be accidentally moved (see Figure 1).

The other arm 20 of the lever 15 extends outward from one side of the bracket 17 so that the lever may be turned about its fulcrum to shift the lever off of the dead center position referred to to withdraw dog 12 from the clutch cam 14.

To shift the lever, a power unit is provided, which unit is of the fluid pressure motor type.

The motor has a cylinder 21 mounted on a bracket 22 secured to the base of the press on the same side as the safety device and below the same. Located in the lower portion of the cylinder 21 is a piston 23 connected to a rod 24 which extends through the upper end of the cylinder, as shown in Figs. 1 and 4. A second piston 25, also in the cylinder, is secured to the rod 24 above the first piston and is smaller in diameter than the latter. Piston 25 operates in the upper part of the cylinder which has a diameter to accommodate the piston. With small and large pistons, their opposed surfaces present differential pressure areas, so that when a pressure, such as provided by compressed air, is admitted into the cylinder 21 between the pistons, the piston assembly will be moved downward if the pressure below the larger piston is less than the pressure between the pistons. A pipe 26 is connected to the cylinder 21 to admit fluid pressure between the pistons. A pipe 27 is connected to the lower end of the cylinder 21 to respectively admit and exhaust fluid pressure to and from the cylinder beneath the larger piston.

A manually operable control valve 28 is employed to control the pressure condition in the cylinder 21 between the pistons and beneath the larger one. A constant supply of pressure is maintained between the pistons so that when the pressure is reduced beneath the larger piston, the piston assembly will move downward to shift lever 15 off of its dead center position to start the press. When the same pressure as maintained between the pistons is admitted beneath the larger piston, the pressure on opposite sides of the larger piston is balanced and the pressure between the pistons acts on the upper or smaller piston to shift lever 15 back to its dead center position to stop the press. This is done after each downward or power stroke of the press so that the press is stopped after each revolution of its driving gear 4. The arm 20 of the lever 15 is connected with the piston rod 24 by a link 29. To compensate for the arcuate movement of the arm 20, the lower end of link 29 is connected with the upper end of the rod 24 by a clevis 30, as shown in Fig. 1.

The control valve 28 is mounted on the press in a position where it may be readily and conveniently reached by the operator while running the press. Said valve, as shown in Fig. 5, comprises a casing 31, secured to one of the upright standards of the press by a bracket 32. The casing 31 provides a chamber 33 in which is located a rotary valve 34, preferably in the form of a circular disc which fits in the chamber and seats against the lower end wall 35 of the same as shown. Said end wall 35 is provided with two ports 36, 37, the former being located at the center of the valve, and the other offset radially outward therefrom, as shown in Figs. 5 and 7. The valve member 34 is provided with a port 38 similarly offset as port 37 and when in register therewith in the turning of the valve connects chamber 33 with a pipe 39 through port 37. Pipe 39 connects with pipe 27 which leads to the lower end of cylinder 21 beneath the large piston 23, as shown in Fig. 1. Valve member 34 is provided in its under side with a radial grove 40 having its inner end constantly connected with port 36 and its outer end disposed to connect with port 37 in the turning of the valve. Port 36 is open to the atmosphere and when groove 40 connects ports 36 and 37, the lower portion of cylinder 21 beneath piston 23 is exhausted and the piston assembly by fluid pressure between the pistons is moved downward to shift lever 15 to start the press. With port 38 closed on its lower side at this time by the end wall 35 of casing 31, there will be no movement of the fluid pressure through chamber 33. Casing 31 is provided in its side wall with a taped hole 41 for connection with a fluid pressure supply pipe 42. Pipe 26, heretofore mentioned, connects with this supply pipe 42 to supply fluid pressure to cylinder 21 between the pistons thereing without passing through the control valve. By this arrangement, both devices 21 and 28 are supplied with fluid pressure from the same source simultaneously.

A shaft 43 is employed to turn the valve member 34. Said shaft, as shown in Fig. 5, is made separate from the valve member and extends into the chamber 33 in axial alignment with the valve member through the upper end wall 44 of the casing. Shaft 43 is provided with a collar 45 within the casing, which collar is designed to seat against a taper 46 surrounding the opening in the end wall 44 through which the shaft extends. The portion of the shaft below the collar is reduced to provide a pressure surface, the purpose of which will presently appear. Valve member 34 is provided with a hub portion 47 having a recess 48 at its upper end and into which recess fits an enlargement 49 on the reduced portion of the shaft adjacent its lower end. The enlargement 49 serves as a guide for the shaft in its endwise movement with respect to the valve member 34, such movement being permitted by a tang 50 at the lower end of the shaft fitting in a slot 51 in the hub of the valve member at the bottom of the recess 48 as shown in Fig. 5. An expansion spring 52 surrounds the portion of the shaft between the valve member 34 and the collar 45, and forces such parts against the walls 35 and 44, respectively. Spring 52 is employed to seat the parts referred to should the fluid pressure between them fall below a seating pressure. Having the collar 45 seated against the edge of the aperture through which the shaft extends and held to its seat by spring and fluid pressure, the chamber cannot leak about the shaft and a stuffing box is not required, thereby reducing the cost and maintenance of the device.

The shaft 43 extends above the casing 31 beyond the end wall 44, and is fitted with a handle or control member 53 by which the valve is turned. The control member 53 is provided with a central hollow hub 54 keyed at 55 to the shaft 43, a nut 56 being screwed on the outer end of the shaft to hold the control member on the shaft. The end wall 44 is provided with an upwardly projecting boss 57 over which fits the lower open end of the hub 54 to hold the control member central and prevent it from tilting. A coiled spring 58 is located in the hub 54 and has one end connected with the hub and the other end connected with the boss 57 so that the spring will normally return the control member to a predetermined position, such a clutch disengaging position, as soon as the operator releases the handle after having moved it to or toward press starting position.

To prevent accidental turning of the control member 53 out of clutch disengaging position, I provide locking means which, as shown in the drawings, comprises a plurality of locking elements 59, 59, carried by the casing 31 at one side thereof, and which elements when in locking position have their outer ends projecting beyond the casing and engaging in a number of holes or recesses 60, 60 in the control member 53, as shown in Figs. 5 and 6. The elements 59 and their corresponding holes or recesses 60 are suitably arranged so that one locking element cannot enter the aperture or recess of any other element. In the drawings, I have shown the parts arranged in circumferential spaced relation about the axis of the shaft 43 and at different radial distances from said axis so that one locking element cannot enter the aperture or another in the turning of the control member 53.

The movement of the locking elements 59 into and out of locking positions is controlled through the fluid pressure which is employed to operate the safety device of my invention. In the particular arrangement showing in the drawings, this is brought about by providing the casing 31 with a plurality of cylinders 61, 61 into which extend the lower ends of the locking elements, which, in the form shown, are similar to plungers. Each plunger 59 has a piston element 62 at its lower end, which element divides the cylinder 61 into upper and lower chambers which communicate through one or more relatively small leak openings or holes 63 in the piston element, as shown in Fig. 5, for equalizing the pressure on both sides of the piston. The under side of the piston having a larger pressure area than on its upper side, the fluid pressure will hold the plunger raised to lock the control member against movement. Fluid pressure is supplied to each cylinder 61 above the piston 62 therein by a passage 64 in the casing 31 between the cylinder and the chamber 33. When the plungers 59 are raised, the beveled surface 65 on each plunger seats against a complementary taper in the bore for the plunger and prevents leakage of fluid pressure out of the cylinder about the plunger.

A plurality of locking elements 59 are employed so that it will necessitate the two operators working on the press using both hands to start the press, thereby keeping their hands away from the die when the plunger descends. To manipulate these locks from the front and rear sides of the press so that the press cannot be operated except when all the locks have been released, I provide a plurality of push button relief valves 66, 66, one for each locking element and connected by pipes or conduits 67, with the lower ends of the respective cylinders 61. When the valve members of the relief valves are moved off their seats by the operators pushing inward on the buttons, the pressure in cylinders 61 beneath the pistons 62 will be relieved to the atmosphere through the discharge openings in the valves. This will effect the release of all of the locks 59 from the control member 53, and the latter can be moved by the operator to start the press. As shown in Fig. 3, two buttons 66 are located on the rear side of the press, and one on the front side adjacent the control valve 28.

The inward movement of the locks 59 is stopped by contact with the bottoms of the cylinders 61, which bottoms may be in the form of screw plugs 68 as shown in Fig. 5. When three locking members 59 are employed, a corresponding number of relief valves 66 will be employed, one for each locking member. With the relief valves 66 located on the front and rear sides of the press, as shown, the helper on the rear side of the press is required to manipulate both of the relief valves on his side of the press and the operator on the front side of the press must actuate his relief valve before the control member 53 is released for the operator to set the press in operation. This positively guards against any possibility of the operator setting the press in operation before both men have both hands clear of the press plunger.

The control member 53 is provided with a pair of stops 69, 69, arranged as to be brought alternately into and out of engagement with the portion of the casing 31 between them and thus limit the movement of the control member between clutch engaged and disengaged positions. To accommodate the apertures 60 in the control member 53, the latter is provided with a relatively flat plate portion 70 on the side of the control member in which the apertures are provided. This plate fits relatively close to the upper surface of the part of the casing 31 through which the locking elements 59 project and has a flat under surface to hold the locking elements depressed as the plate is moved into and out of press starting position. As soon as the control member effects disengagement of the clutch, the apertures 60 are brought opposite their respective plungers 59 and the latter by reason of the fluid pressure acting thereon will raise the plungers into the apertures and lock the control member against accidental movement.

With a press equipped with a safety device of the character described, accidental repeating of the press is positively prevented in the normal operation of the press. The device is especially serviceable on the so-called high speed presses, which by reason of the rapidity at which they operate return the plunger or ram so fast that an operator has practically no time in which to remove his hands from the path of the plunger should it accidentally repeat while the operator has his hands in the press. The locking mechanism described holds the control member against accidental movement and prevents the operator from operating the control member to start the press only when the hands of both workmen are in the clear. Thus accidents due to accidental repeating of the press are avoided, and the workmen on the press are assured of safety when inserting a blank or removing a stamping from the press.

Should it be necessary or desired at any time to operate the press without the locking elements 59, these may be held out of locking position by closing the passages 64 between the chamber 33 and the cylinders 61. One way in which this can be accomplished is shown in Fig. 5. As illustrated, I provide for each cylinder 61 a screw provided member 71 which extends into the cylinder in line with the passage through a slot 72 in the associated plunger 59, so that the inner end of the member 71 may reach the passage 64 and close it when the member is screwed against the end of the passage. A blind nut 73 is screwed on the outer end of the member 71 to lock it in either open or closed position. The outer end of the member 71 is provided with a slot or kerf whereby a screw driver may be engaged with the member to turn it. The nut 73 may be provided with a bit for this purpose as shown at 74 in Fig. 5.

The details of construction and arrangement of parts shown and described may be variously changed and modified without departing from the spirit and scope of my invention, except as pointed out in the annexed claims.

I claim as my invention:

1. A valve device of the character described, comprising a casing having inlet and outlet ports, a vale member rotatably mounted in said casing for controlling the passage of pressure fluid therethrough, a control member connected with the valve member for rotating the same, a locking element having a piston, the opposite sides of which are acted on by the pressure fluid supplied to the casing for normally holding the element in a position to automatically engage and lock the control member in a predetermined position, and means for relieving the pressure on one side of the piston to move the element by the pressure on the other side of the piston into a position unlocking the control member.

2. A valve device of the character described, comprising a casing having inlet and outlet ports, a valve member rotatably mounted in the casing for controlling the flow of pressure fluid therethrough, a control member connected with the valve for rotating the same and having a plurality of apertures therein, a plurality of movable locking elements actuated by the pressure fluid supplied to the casing for automatically engaging with the apertures in the control member for locking the same in a pre-determined position, and means whereby said elements may be moved out of said apertures to unlock the control member, said apertures and elements being circumferentially arranged about the axis of the valve and at different distances from the center thereof so that one element will not enter the aperture for another.

3. A valve device of the character described, comprising a casing having inlet and outlet ports, a valve member rotatably mounted in said casing for controlling the flow of fluid pressure therethrough, a control member connected with the valve for rotating the same and having a plurality of spaced apertures therein, a plurality of cylinders carried by the casing in the same spaced relation as the apertures, a plurality of plungers, one in each cylinder, means whereby pressure fluid may be admitted from the casing to the cylinders for normally holding the plungers in positions to engage the apertures in the control member for locking the same in a predetermined position, and means whereby the pressure in the cylinders may be reduced when desired to release the plungers from the control member.

4. A valve device of the character described, comprising a casing having inlet and outlet ports, a valve member rotatably mounted in said casing to control the flow of pressure fluid therethrough, a control member connected with the valve member for rotating the same, a cylinder carried by the casing, a plunger to engage the control member to lock it in a predetermined position and having a piston in said cylinder, said piston dividing the cylinder into two chambers having communication through an aperture in the piston, port means connecting the interior of the casing with one of said chambers, and means whereby the pressure on the plunger in the other chamber may be reduced to effect movement of the plunger out of locking engagement with the control member by the action of the pressure fluid in the other chamber on said piston.

BERT H. HAWKINS.